United States Patent
Wong et al.

(10) Patent No.: US 9,203,755 B1
(45) Date of Patent: Dec. 1, 2015

(54) ERROR MESSAGE MONITORING IN A NETWORK ENVIRONMENT

(75) Inventors: Chiu Ngok Eric Wong, San Jose, CA (US); Jayaraman R. Iyer, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 303 days.

(21) Appl. No.: 13/246,578

(22) Filed: Sep. 27, 2011

(51) Int. Cl.
*H04L 12/28* (2006.01)
*H04L 12/801* (2013.01)
*H04L 12/26* (2006.01)

(52) U.S. Cl.
CPC ............ *H04L 47/10* (2013.01); *H04L 43/0829* (2013.01)

(58) Field of Classification Search
CPC ............ H04W 28/02; H04W 28/0273; H04W 28/0284; H04W 28/0289
USPC ............... 370/252, 231, 230.1, 413–414, 416
See application file for complete search history.

(56) References Cited

U.S. PATENT DOCUMENTS

| | | | |
|---|---|---|---|
| 6,415,329 B1 * | 7/2002 | Gelman et al. ................. | 709/245 |
| 7,200,111 B2 * | 4/2007 | Garcia-Luna-Aceves et al. .............................. | 370/230 |
| 7,606,159 B2 * | 10/2009 | Dalal et al. .................... | 370/237 |
| 7,961,715 B1 * | 6/2011 | Dhesikan et al. ............. | 370/352 |
| 8,259,585 B1 * | 9/2012 | S P et al. ........................ | 370/237 |
| 2004/0264366 A1 * | 12/2004 | Swami .......................... | 370/229 |
| 2005/0058083 A1 * | 3/2005 | Rogers .......................... | 370/252 |
| 2006/0029037 A1 * | 2/2006 | Chen et al. .................... | 370/351 |
| 2006/0146830 A1 * | 7/2006 | Lin et al. ....................... | 370/394 |
| 2011/0002236 A1 * | 1/2011 | Chen et al. .................... | 370/252 |
| 2011/0013511 A1 * | 1/2011 | Li et al. ......................... | 370/231 |
| 2011/0090795 A1 * | 4/2011 | Li et al. ......................... | 370/235 |

OTHER PUBLICATIONS

M. Allman, et al., "TCP Congestion," RFC 2581, Apr. 1999; 4 pages [retrieved and printed from the http://www.opalsoft.net/qos/TCP-1010.htm on Sep. 26, 2011].

\* cited by examiner

*Primary Examiner* — Dang Ton
*Assistant Examiner* — Sai Aung
(74) *Attorney, Agent, or Firm* — Patent Capital Group (57) ABSTRACT

A flow of packets sent from a server device over a TCP network to at least one endpoint device is identified, the endpoint device accessing the TCP network over a wireless access network. A message is identified from the endpoint device to the server device communicating an error condition relating to at least one packet in the flow. At least one processing device is used to predict that the error condition is based, at least in part, on a non-congestion-related condition within the wireless access network. The message is filtered to exclude communication of the error condition to the server based on the prediction that the error condition is based, at least in part, on a non-congestion-related condition within the wireless access network. In some aspects, the message can include a TCP duplicate acknowledgement ("DUP ACK") message.

18 Claims, 9 Drawing Sheets

FIG. 5

ERROR MESSAGE MONITORING IN A NETWORK ENVIRONMENT

TECHNICAL FIELD

This disclosure relates in general to the field of communications and, more particularly, to error handling in a mobile communications environment.

BACKGROUND

Radio technology has developed to allow for wireless networks providing computing devices access to remote resources, including Internet-based resources. Mobile wireless networks have also been developed, allowing mobile computing devices, such as smart phones, tablets, and laptops, to access, use, and leverage the robust content and services available, for instance, on the Internet. Computing devices can access such resources over networks employing TCP/IP. Mobile computing devices can participate in wireless networks and access at least partially wireline TCP/IP networks, including the Internet, using wireless gateways, mobile gateways, and the like. Accordingly, mobile computing devices, themselves can participate in and handle packets according to TCP and/or IP protocols, including error conditions, such as the sending of duplicate acknowledgements (or "dup acks") in response to missing or out-of-order packets.

Further, a variety of different wireless gateways have been developed, for instance, depending on the wireless technology employed and services offered by particular service providers. For instance, a variety of features have been developed and included in modern mobile gateways, including service-based routing, deep packet inspection, and other functionality.

BRIEF DESCRIPTION OF THE DRAWINGS

Like reference numbers and designations in the various drawings indicate like elements.

DETAILED DESCRIPTION OF EXAMPLE EMBODIMENTS

Overview

In general, one aspect of the subject matter described in this specification can be embodied in methods that include the actions of identifying a flow of packets sent from a server device over a TCP network to at least one endpoint device, the endpoint device accessing the TCP network over a wireless access network. A message can be identified from the endpoint device to the server device communicating an error condition relating to at least one packet in the flow. At least one processing device can be used to predict that the error condition is based, at least in part, on a non-congestion-related condition within the wireless access network. The message can be filtered to exclude communication of the error condition to the server based on the prediction that the error condition is based, at least in part, on a non-congestion-related condition within the wireless access network.

In another general aspect of the subject matter described in this specification can be embodied in systems that include at least one processor device, at least one memory element, and a TCP message manager. The TCP message manager can be adapted to identify a flow of packets sent from a server device over a TCP network to at least one endpoint device, the endpoint device accessing the TCP network over a wireless access network. The TCP message manager can be further adapted to identify a message from the endpoint device to the server device communicating an error condition relating to at least one packet in the flow, predict that the error condition is based, at least in part, on a non-congestion-related condition within the wireless access network, and filter the message to exclude communication of the error condition to the server based on the prediction that the error condition is based, at least in part, on a non-congestion-related condition within the wireless access network. In some aspects the TCP message manager can be included in a network gateway. In some aspects, the TCP message manager can be further adapted to identify a plurality of TCP messages sent from devices over the wireless access network, determine characteristics of the wireless access network based on the plurality of TCP messages, and define at least one policy based on the determined characteristics, where subsequent data flows are routed within the wireless access network according to the at least one policy.

These and other embodiments can each optionally include one or more of the following features. The error condition can identify a loss of at least one packet in the flow of inbound packets detected by the endpoint device. The particular lost packet can be identified from the message. A copy of the particular lost packet can be caused to be sent to the endpoint device. The series of inbound packets can be cached and the copy can be retrieved from the cache and sent to the endpoint device. Causing the copy of the particular lost packet to be sent to the endpoint device can include requesting the particular lost packet from the server and forwarding the particular lost packet to the endpoint device. The message can be a TCP duplicate ACK message. Predicting that an error condition is based on a non-congestion-related condition within the wireless access network can include identifying at least two TCP duplicate ACK messages for a particular lost packet in the flow sent from the endpoint device. The error condition can be predicted to be based, at least in part, on lossy conditions within the wireless access network. The error condition can be attempted to be remedied and communication between endpoint and server can be monitored following the attempt to remedy the error condition. The prediction can be revised, based on the monitoring, to predict that the error condition is not based on a congestion-related condition. A particular portion of the wireless access network can be identified corresponding to the error condition. A particular base station within the wireless access network can be identified corresponding to the error condition. Error data can be collected from the message for use in statistical analysis of the wireless access network. Statistical analysis can be based on a plurality of TCP messages, each message in the plurality of TCP messages communicating a respective error condition within the wireless access network. Further, results of the statistical analysis can be used to generate a policy for the wireless access network, and subsequent data flows can be routed within the wireless access network according to the generated policy.

Some or all of the features may be computer-implemented methods or further included in respective systems or other devices for performing this described functionality. The details of these and other features, aspects, and implementations of the present disclosure are set forth in the accompanying drawings and the description below. Other features, objects, and advantages of the disclosure will be apparent from the description and drawings, and from the claims.

EXAMPLE EMBODIMENTS

Figure 1:
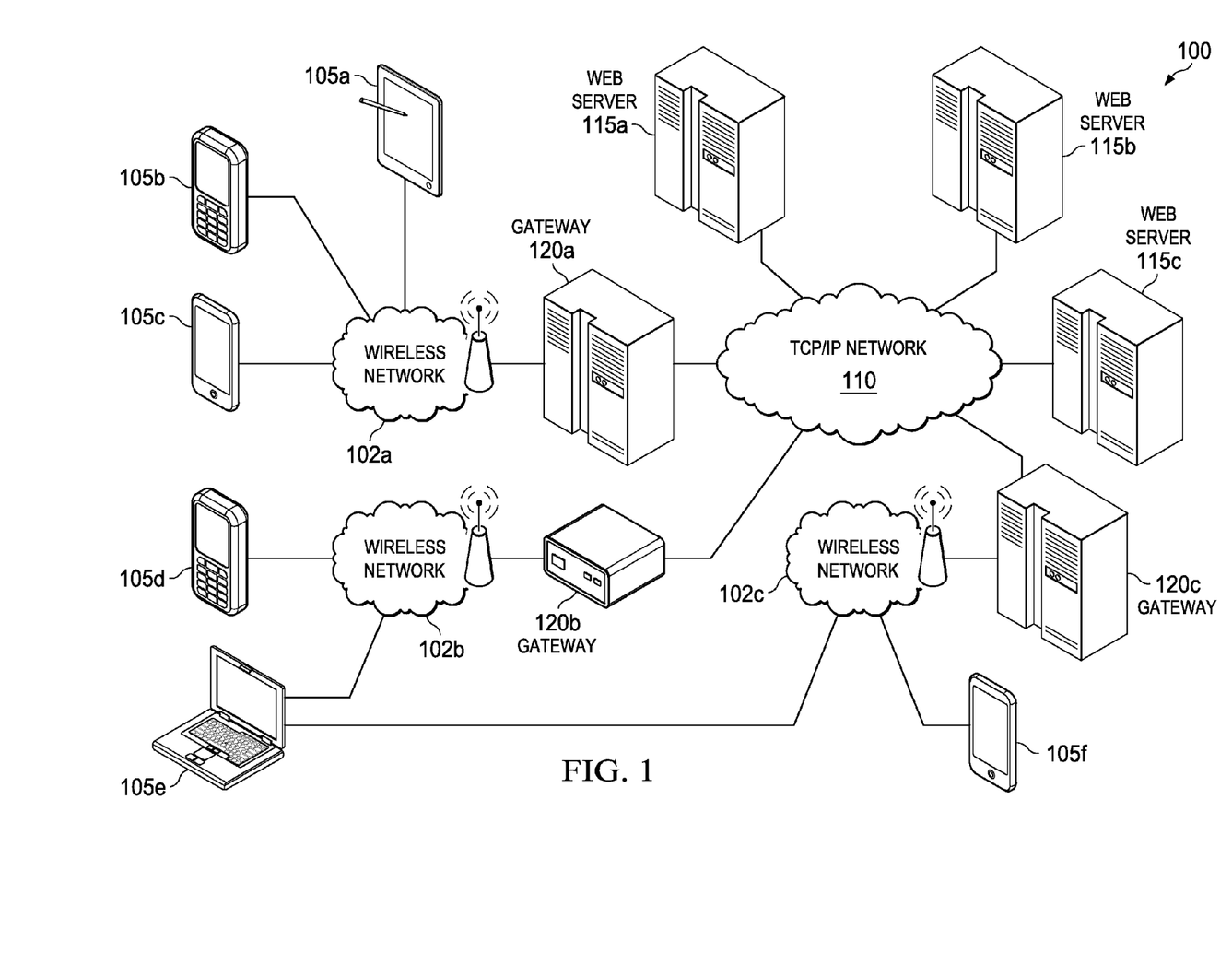
FIG. 1 is a simplified block diagram of a wireless communications system in accordance with one embodiment.

FIG. 1 is a simplified block diagram of an example embodiment of a communication system 100, which can be associated with one or more wireless networks (e.g., 102a-c). Such wireless networks can include networks implemented using WiFi, WiMAX, 3G, 4G, LTE, CDMA, GSM, and other wireless and radio networking technologies, standards, and protocols. The example architecture of FIG. 1 includes multiple instances of user client (or endpoint) devices 105a-f, each of which may connect to the Internet or other TCP/IP networks (e.g., 110) and communicate with servers and other nodes (e.g., 115a-c) in (or using) such networks 110. Indeed, client devices 105a-f can connect wirelessly to one or more wireless access nodes or gateways (e.g., 120a-c) over wireless networks (e.g., 102a-c) in order to access and communicate data over one or more TCP/IP networks (e.g., 110). In that wireless networks (e.g., 102a-c) provide an endpoint device with access to another network (e.g., 110) such as a core network or an at least partially wired network, the wireless network (e.g., 102a-c) participates as a wireless access network for the corresponding endpoint device.

One or more gateway systems or devices (e.g., 120a-c) can provide a point of presence to other networks, such as the Internet, allowing client devices 105a-f in a wireless network to consume one or more resources and services provided by node devices and servers 115a-c connected to the network (e.g., 110). Access gateways and nodes (e.g., 120a-c) can, in some instances, further include mobile gateway systems in mobile wireless networks, such as 3G, 3GPP, 4G, LTE, CDMA, and GSM communication networks. Gateways 120a-c can include various network elements for use in exchanging, analyzing, and modifying packets in an at least partially wireless network environment and in accordance with the technologies and protocols employed in the corresponding wireless network, including wireless mobile networks, WLANs, WiFi networks, etc. For instance, in the case of mobile gateways in mobile wireless networks, policy engines can be provided with or in communication with a mobile gateway system to provide, for instance, data for use in authentication, authorization, and accounting (AAA) operations as well as provide subscriber-level intelligence regarding services and service policies associated with each subscriber in one or more particular mobile communication networks. Other network elements, such as network elements in mobile network implementations, can include home agent routers, packet gateways, such as a packet data network gateway (PGW), and other components, subsystems, and elements.

Further, in implementations where a mobile communication network serves as an access network for one or more endpoint devices, packets handled by a gateway in the mobile communication network (i.e., a mobile gateway) can be processed using high-touch handling techniques (above and beyond normal, destination IP address-based forwarding) in connection with the forwarding of packets in the network. Examples of high-touch handling include such functions as Generic Routing Encapsulation (GRE) encapsulation, quality of service (QoS), Multiprotocol Label Switching (MPLS), virtual private networks (VPNs), and secure socket layer (SSL)/IPsec encryption/decryption. In a mobile network, the data plane may be responsible for packet processing at a session/flow level, multiple flows/session per active user, access control list (ACL)/traffic flow template (TFT) filters per user/flow, tunneling, rate limiting, subscriber scalability, security, and Layer 7 (L7) inspection.

As used herein, "gateway," "network gateway," "wireless gateway," "gateway system," "gateway device," etc. can include any device, component, module, system, or subsystem adapted to couple and manage routing of data from a wireless, or radio, access network to an at least partially wired network, such as a core network, local access network, Internet, etc. Gateways can include gateways for mobile and stationary wireless networks. For instance, a WLAN can include a gateway adapted for use in routing and managing routing of packets from a WiFi-based WLAN to a core TCP/IP network. In other instances, a gateway can include mobile radio gateways for providing clients in a mobile wireless network access to a core network or the Internet, among other examples. Further, wireless access networks, wireless networks, radio access networks, and the like can refer to networks or portions of a network positioned between endpoint devices and an at least partially wired network, such as a core network or the Internet, and employing radio access technology, such as 3G, 4G, LTE, WiFi, WiMAX, and other radio communication technologies.

Elements of FIG. 1 may couple to one another through simple interfaces (as illustrated) or through any other suitable connection, which provides a viable pathway for network communications. Additionally, any one or more of these elements may be combined or removed from the architecture based on particular configuration needs. Communication system 100 may further include transmission control protocol/Internet protocol (TCP/IP) communications for the transmission or reception of packets in a network, and may also operate in conjunction with a user datagram protocol/IP (UDP/IP) or any other suitable protocol where appropriate and based on particular needs.

User client devices 105a-f can be associated with clients, customers, or end users wishing to initiate a communication in system 100 via some wireless network (e.g., 102a-c) and generating and/or consuming wireless network traffic. The term "endpoint" is inclusive of devices used to initiate a communication, such as a computer, a personal digital assistant (PDA), a laptop or electronic notebook, a cellular telephone, an iPhone, a Blackberry, a smartphone, a tablet, an iPad, an IP phone, or any other device, component, element, equipment, or object capable of initiating voice, audio, video, media, or data exchanges within communication system 100. User client devices 105a-f may also be inclusive of a suitable interface to the human user, such as a microphone, a display, or a keyboard or other terminal equipment. User client devices 105a-d may also be any device that seeks to initiate a communication on behalf of another entity or element, such as a program, a database, or any other component, device, element, or object capable of initiating an exchange within communication system 100. User client devices can may also include any device (such as a sensor or meter) used to capture an event (such as temperature) or other data (such as geolocation data), which is then relayed through the network to an application that translates the event into meaningful information. Data, as used herein in this document, refers to any type of numeric, voice, video, media, or script data, or any type of source or object code, or any other suitable information in any appropriate format that may be communicated from one point to another.

In certain example techniques of communication system 100, TCP/IP networks 110 may provide users with connectivity to networked resources such as corporate servers, extranet partners, webservers, application servers, multimedia content, the Internet, and any other application envisioned within TCP/IP networks. While these networks generally function to carry data plane (user-generated) packets, they may also implicate control plane and management plane packets. TCP/IP network elements such as routers and switches can, in some instances, distinguish between data plane, control plane, and management plane packets, enabling each packet to be suitably processed. In general, it can be understood that the data plane (also known as the forwarding plane or the user plane) provides the ability to forward data packets; the control plane provides the ability to route data correctly; the management plane provides the ability to manage network elements.

TCP plays a central role in modern Internet traffic, and TCP is poised to remain the dominant transport protocol for some time. Further, with the proliferation of wireless technology, more devices are connected each day to the Internet wirelessly. While wireless connectivity provides the ease of mobility and introduces new use cases and applications of the Internet, fluctuations and lossy conditions in the radio channel can have a significant influence on the behavior and effect of TCP. For instance, radio channel fluctuations can include "slow" and "fast" fluctuations. For example, during periods of slow fluctuations, the radio channel can experience prolonged periods of poor link quality resulting in packet loss and delay. During periods of fast fluctuations, a momentary loss of link quality can be observed at the radio channel. In such instances, TCP can trigger a reduction in its congestion window size in response to the fluctuations. As a result, in some instances, radio channel fluctuations and errors can be doubly burdensome, by compromising the quality of communication over the radio channel itself, while also causing downgrades in TCP data delivery.

Computing system 100, in some implementations, can resolve many of the issues pertaining to TCP congestion window triggers stemming, at least in part, from error conditions within wireless (or radio) access networks, among other issues. For instance, a gateway system or device can be provided that is adapted to monitor the delivery of TCP traffic over a radio access network (RAN), as well as, in some instances the traffic conditions at the individual cell sites or base-stations. For instance, a gateway system or device can be provided that is adapted to detect congestion in corresponding cell sites and wireless access network based on the detection of TCP duplicate ACKs forwarded through the gateway from client devices on the wireless access network. So equipped, a gateway can also be used to differentiate between congestion and wireless losses between the gateway and device, in addition to congestion at individual cell sites, base-stations, sub-networks, and other portions of a wireless access network, include the wireless access network itself. As part of the TCP protocol suite, duplicate ACKs are sent to the TCP source whenever out-of-order segments are received. Depending on the implementation of TCP, the source (e.g., server) may retransmit missing segments, or declare that a packet is lost (e.g., fast retransmit after three duplicate ACKs). Accordingly, TCP duplicate ACKs monitored at the gateway can contain valuable information that can be analyzed to make predictions, assumptions, and conclusions about conditions of the radio channel, as well as individual base-stations or cell sites, among other examples. Additionally, the monitoring of TCP traffic can also be used to differentiate congestion and wireless losses at the gateway in the case of fast radio channel fluctuations in order to realize better efficiency and reliability in the delivery of data traffic over wireless networks to thereby adopt better quality of service ("QoS") provisioning and network management policies.

Figure 2:
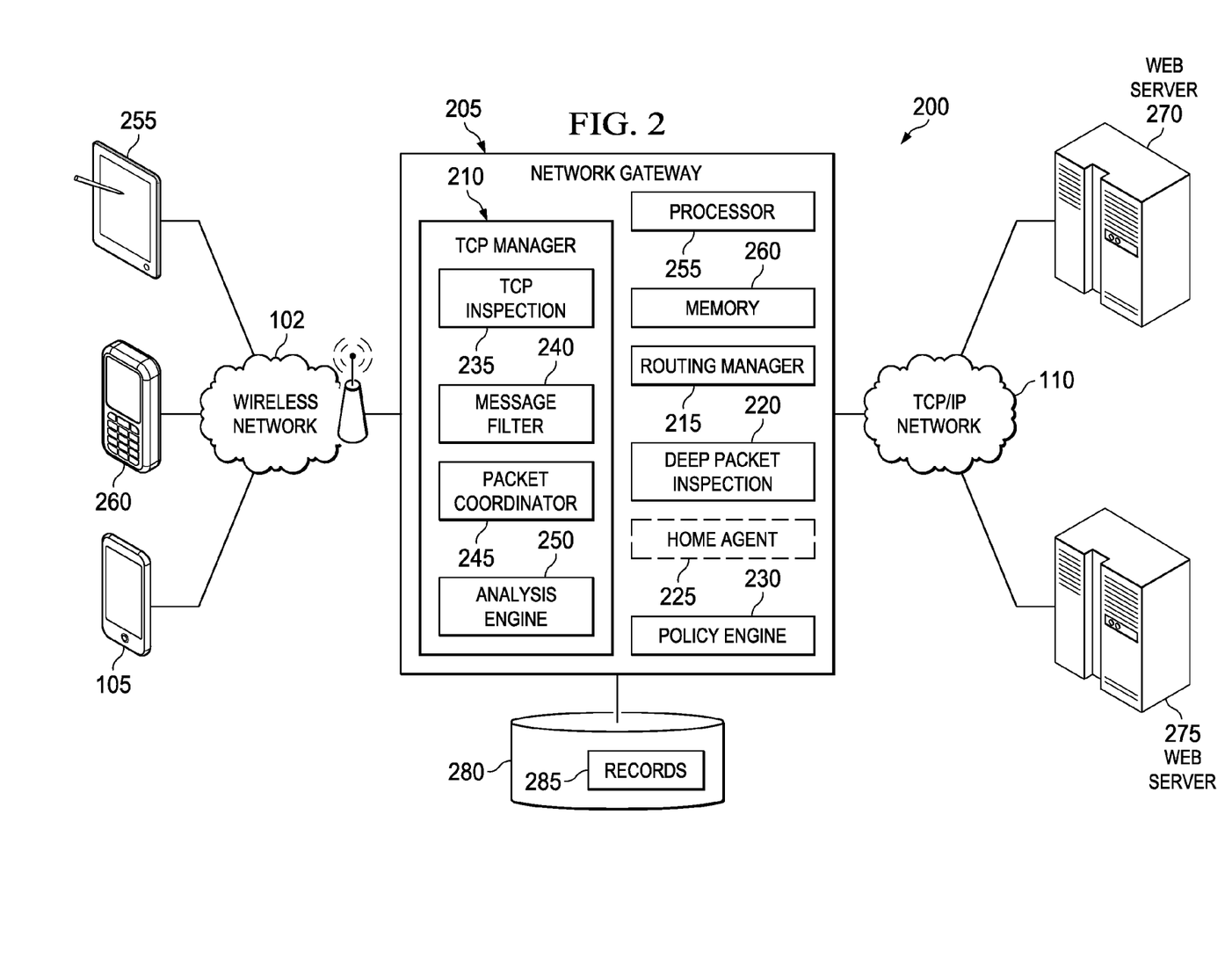
FIG. 2 is a simplified block diagram of an example gateway system including an TCP messaging manager in accordance with one embodiment.

For instance, FIG. 2 illustrates a simplified block diagram of an example communication system 200 including an improved gateway system 205 including a TCP manager 210 in accordance with one embodiment. Using TCP manager 210, TCP packets forwarded through gateway 205 can be inspected and tracked to improve performance of wireless networks 102, including WiFi, cellular, WiMAX, and other networks. In addition to TCP manager 210, and in accordance with the functionality and wireless network of the particular gateway system 205, gateway 205 can additionally include, in some instances, a routing manager 215, deep packet inspection module 220, home agent 225 (e.g., in cellular network implementations), and policy engine 230. Further, gateway 205 can include at least one processing device 255 and memory 260, as well as other interfaces, hardware, and components.

TCP manager 210 can include a TCP inspection module 235, message filter 240, packet coordinator 245, and analysis engine 250 among other modules and functionality, including combinations of the foregoing. In some instances, TCP inspection module 235 can be adapted to recognize TCP messaging in packets exchanged over the gateway 205 as well as the nature of the TCP messaging and particular client devices, servers, base stations, RANs, and other network elements in wireless access network 102 communicating, referenced in, or otherwise related to the TCP messaging. In some instances, TCP inspection module 235 can operate in connection with (or be embodied as) a deep packet inspection module 220 resident on or otherwise operating in connection with the gateway 205. TCP messages, such as ACKs, sent from client devices 255, 260, 265 over wireless access network 102 and intended for a remote web server (e.g., 270, 275) can be intercepted by TCP manager 210 and inspected (e.g., using TCP inspection module 235) to identify the source client device, destination web server, and/or other information including a particular base station, cell site, subnet, particular access network elements, or RANs used by the client device to send the message, as well as other information, such as the time the data (or packets conveying the data) were sent, as well as other examples.

Data collected from TCP data forwarded by the gateway 205 can be preserved, at least temporarily, in TCP record data 280 stored in one or more data stores 285 managed or otherwise accessed by gateway 205. Analysis engine 250 can be used to analyze TCP record data 280 to draw certain conclusions, recognize trends, and perform other evaluations using TCP record data 280, including identifying underperforming wireless access network 102 assets, such as particular underperforming base stations or RANs (or even client devices) based on collected TCP record data 280. Further, policies can be developed based on TCP record data 280 and enforced, for instance, using policy engine 230, against subsequent data flows and communication sessions handed by the gateway 205.

Among the TCP message data that can be identified by TCP inspection module 235, TCP error conditions, such as duplicate ACKs, can be identified and tracked, at least in part, using TCP inspection module 235. In some instances, analysis engine 250 can determine, for instance, based on predefined rules, conditions, and/or thresholds, that particular TCP error conditions, and TCP message data communicating such conditions, be filtered, blocked, or otherwise modified or handled, for instance, using message filter 240, in response to receiving such TCP message data. In one particular implementation, duplicate ACKs can be identified and filtered, or blocked, so as not to be forwarded from the gateway 205 to its destination endpoint (e.g., web servers 270, 275). This can be in response to a determination by TCP manager 210 that the duplicate ACKs spring from network losses or other errors on the wireless access network side of the gateway 205, and not congestion, as may be interpreted by the destination web server if such duplicate ACKs were to be delivered. Further, in such instances, in order to quell the re-sending of duplicate ACKs from a particular client device, packet coordinator 245 can be used to facilitate attempts to remedy an identified error condition within the access network. For instance, packet coordinator 245 can be used to facilitate the delivery of packets that a client may have identified as being lost, out-of-order, etc. in error messages communicated through the gateway 205.

Figure 3A:
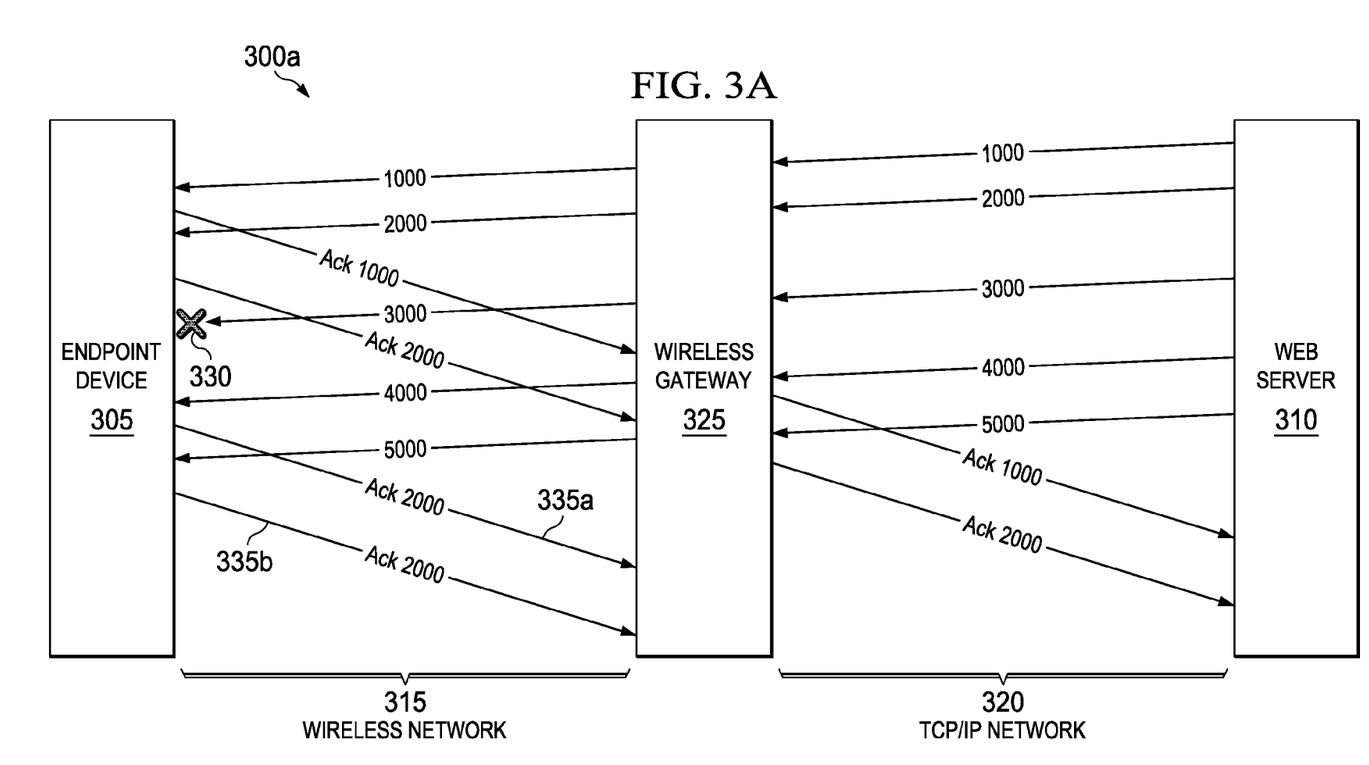
FIGS. 3A-3E are simplified block diagrams illustrating example interactions with an example gateway system in accordance with at least some embodiments.

FIGS. 3A-3E are simplified block diagrams 300a-e illustrating example interactions with an example gateway system, such as gateways similar to those shown and described in FIGS. 1-2. In FIG. 3A, a diagram 300a is shown of data exchanged between a client endpoint device 305 and one or more web servers 310 over a wireless access network 315 and TCP/IP network 320, with a gateway device 325 providing one or more client devices (e.g., 305) access to the TCP/IP network. In the example of FIG. 3A, web server 310 sends packets "1000" through "5000" to endpoint device 305 over wireless gateway 325. In response to receiving the packets, endpoint device 305 sends TCP ACK messages (e.g., Ack 1000, Ack 2000) to the web server 310 over radio channels (e.g., 325) and wireless gateway 325 to web server 320 on TCP/IP network 320. In the particular example of FIG. 3A, while packet 3000 was successfully received from TCP/IP core network 320 by wireless access network 315, lossy or congestion conditions within wireless access network 315 resulted in packet 3000 being lost 330, or otherwise not being successfully or accurately delivered to endpoint device 305. Consequently, consistent with TCP, endpoint device 305 sends one or more duplicate TCP ACKs ("Ack 2000" 335a-b) for delivery to server 310, indicating an error or packet loss (e.g., of packet 3000) in connection with its communication with server 310. Receipt of the duplicate ACK message 335a-b can, in some instances, and in accordance with TCP thresholds or rules at server 310, result in the reduction of the congestion window for communications with endpoint device 305, potentially degrading the quality and speed of transmissions between at least client device 305 and server 310.

Figure 3B:
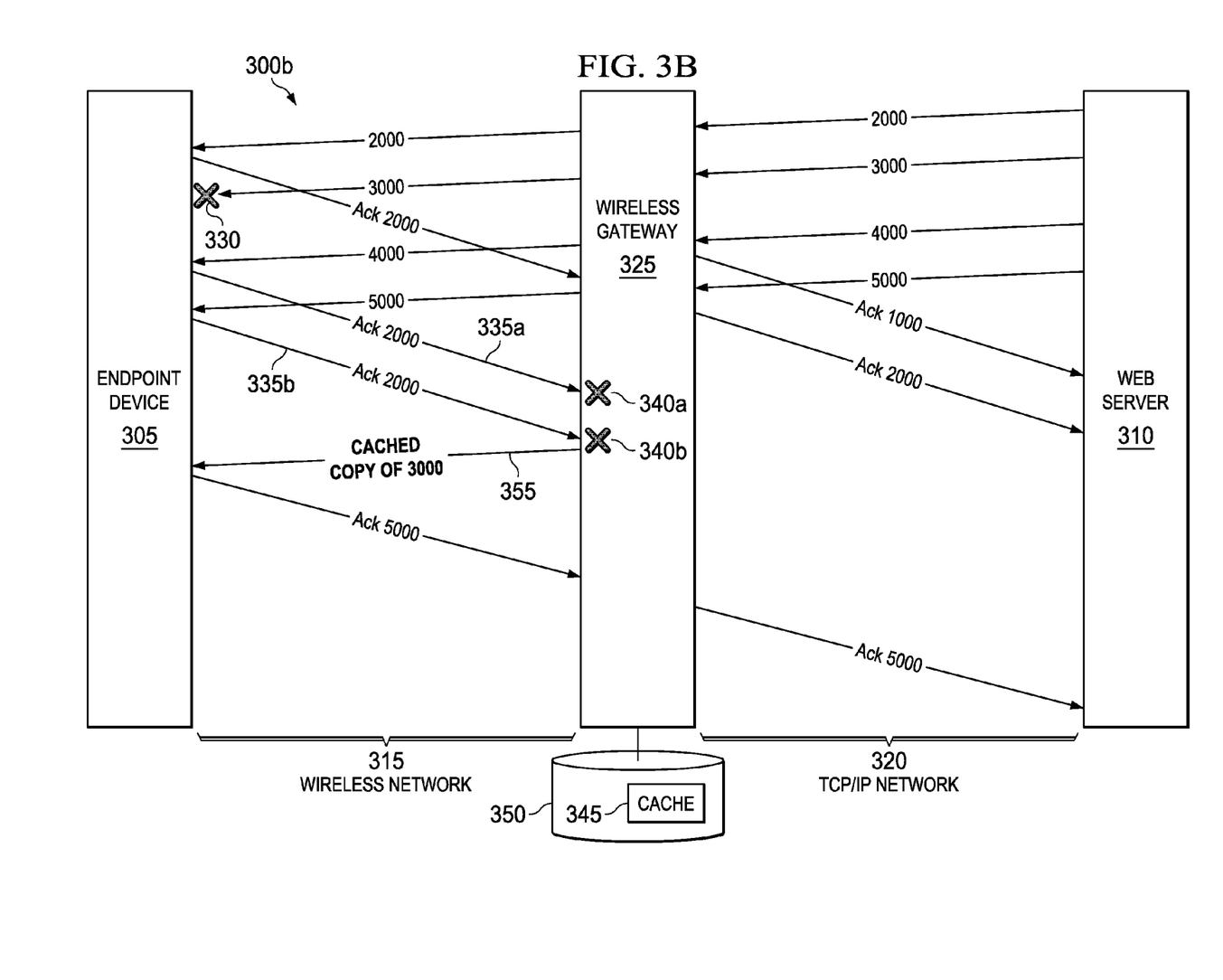

Turning to FIG. 3B, wireless gateway 325 can be equipped with functionality for monitoring TCP messaging between endpoint device 305 and server 310, for example, similar to the features and examples described above. For instance, wireless gateway 325 can recognize duplicate ACKs 335a-b from endpoint device 305 bound for server 310, among other information concerning the duplicate ACK messages 335a-b. Gateway 325 can then make a determination, prediction, or assumption concerning the underlying cause of the TCP error message. In some instances, gateway 325 can predict the cause of the TCP error message based on probabilistic data and assumptions or in accordance with pre-set rules for handling such error messages, between congestion-related causes and wireless loss. For example, in some implementations, gateway 325 can adopt a rule, policy, and/or model suggesting that multiples of the same duplicate ACK message (e.g., 335a-b) suggest wireless loss, as multiples of the same duplicate ACK message suggest that other packets in a flow are being received and that the packet loss (e.g., packet 3000) was only a momentary aberration and the result of wireless loss. Other models and techniques can be employed for distinguishing, predictively, between congestion- and wireless-loss-based TCP error messages. For instance, a statistical model can be developed, such as one based on pre-observed data for the particular wireless network (or portion of the network) that can consider various features and conditions in the network and predict probabilistically whether the TCP duplicate ACK resulted from congestion or wireless loss.

In the example of FIG. 3B, gateway 325 determined that the loss 330 of packet 3000 causing duplicate ACKs 335a-b was likely the result of lossy conditions, or other non-congestion related conditions, within wireless access network 315, rather than congestion in wireless access network 315. Accordingly, and in an effort to avoid having the congestion window for endpoint device 305 (and potentially other devices in wireless access network 315) unnecessarily reduced in response to the duplicate ACKs 335a-b, wireless gateway 325 can filter 340a-b duplicate ACKs 335a-b stemming from the loss of packet 3000 to keep the duplicate ACKs 335a-b from being forwarded to server 310.

Further, in some implementations, in an attempt to placate endpoint device 305 and eliminate the generation and sending of more duplicate ACKs relating to lost packet 3000, gateway 325 can be used to assist in resending or otherwise providing a copy of the lost packet(s) (e.g., 3000) to endpoint device 305 to allow communication between endpoint device 305 and server 310 to proceed without further duplicate ACKs. In one example, shown in FIG. 3B, recently received packets forwarded through gateway 325 can be cached, for instance in cache 345 in one or more data stores 350. Accordingly, gateway 325 can identify the missing packets based, at least in part, on intercepted duplicate ACK messages (e.g. 335a-b), obtain a copy of the lost packet (e.g., packet "3000") and provide the copy 355 of the lost packet to the endpoint device 305. This can result in a new ACK message (e.g., "Ack 5000") being sent by the endpoint device 305 indicating that the lost packet has been remedied. Gateway 325 can allow this (non-duplicate) ACK to pass through and be forwarded to server 310 allowing communication to proceed between endpoint device 305 and server 310.

Figure 3C:
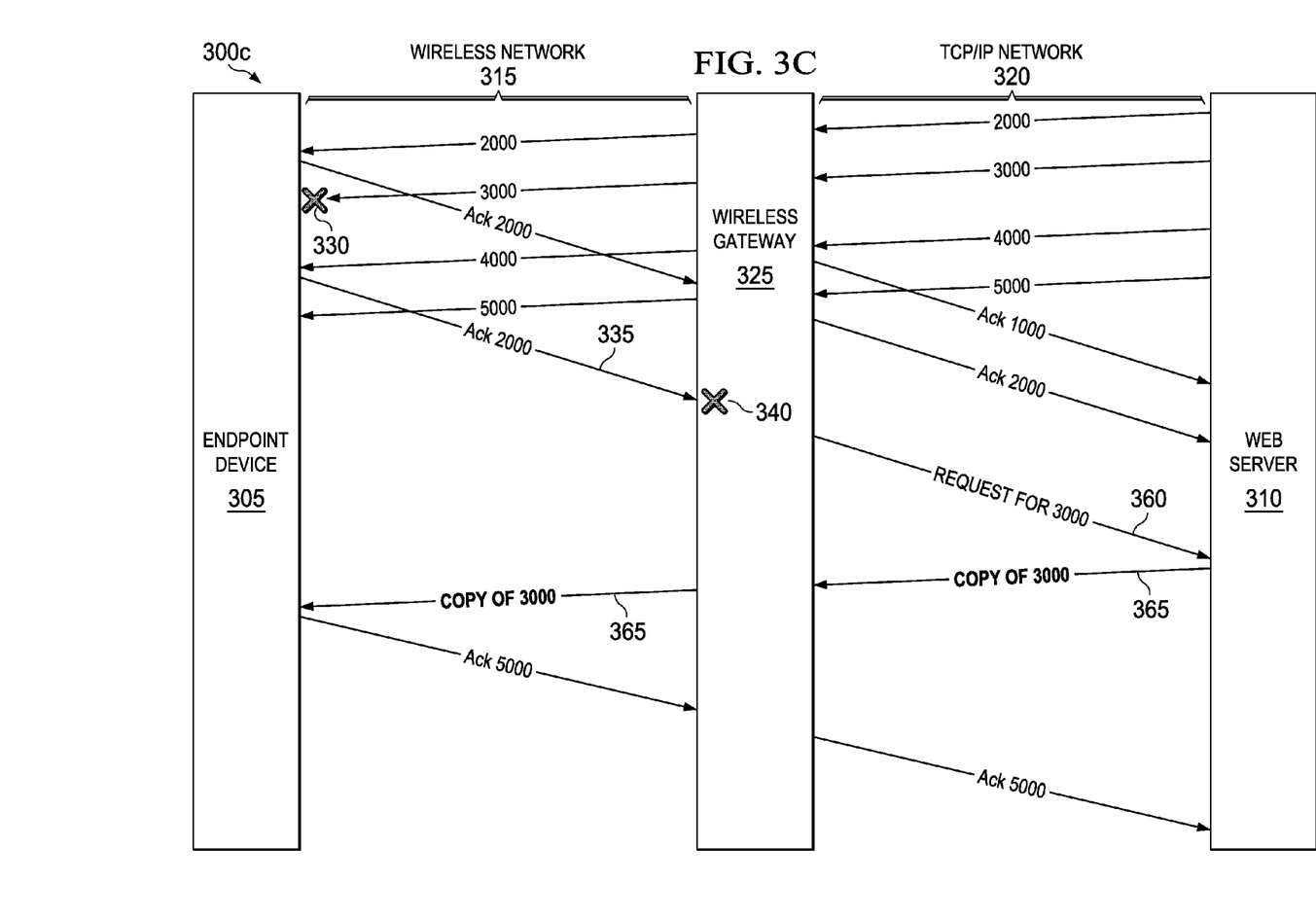

In other examples, such as shown in FIG. 3C, a copy of a lost packet (e.g., 3000) can be provided to endpoint device 305 through mechanisms other than caching (as in the example of FIG. 3B), in an attempt to halt a series of duplicate ACKs sent from the endpoint device 305. For instance, upon determining that a duplicate ACK should be filtered 340 at the gateway 325, gateway 325 can initiate an attempt (e.g., 360) to obtain a copy of the lost packet identified by the duplicate ACK (e.g., the next unacknowledged packer in the flow, packet 3000). For example, gateway 325 can request that a copy of the lost packet be sent to gateway 325, for example, from server 310. In some instances, gateway 325 can hide that the request 360 coincides with a potential congestion event or other error downstream from the web server 310, so as to protect against the reduction of a congestion window for clients on wireless network 315. Other techniques can be used, including requesting the copy of the lost packet from other sources. Further, once the replacement packet is obtained, gateway 325 can forward the packet 365 to client device 305, together with header data that allows the client to identify that the replacement copy 365 of the packet belongs to the data flow for which the client 305 generated duplicate ACKs.

Figure 3D:
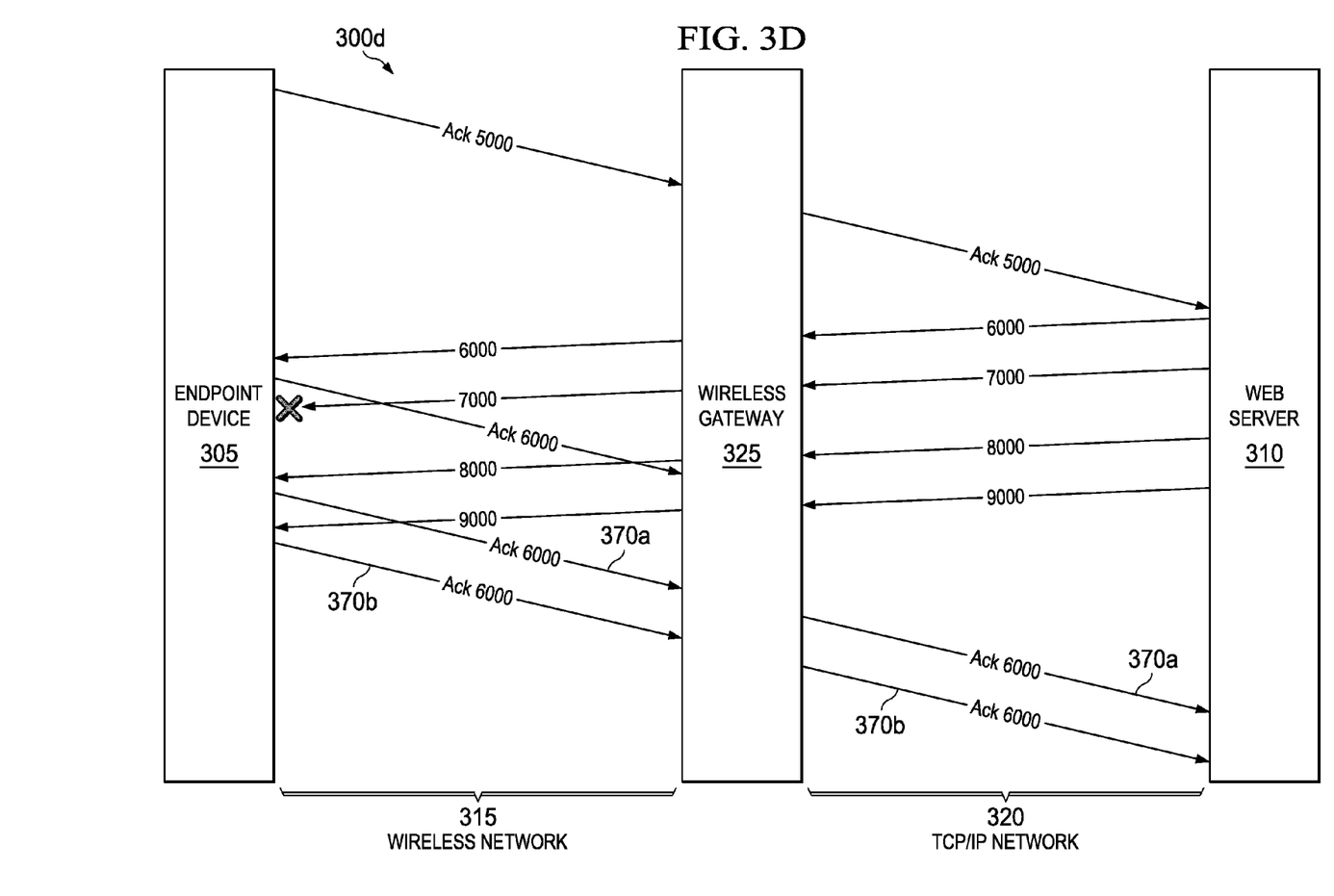
Figure 3E:
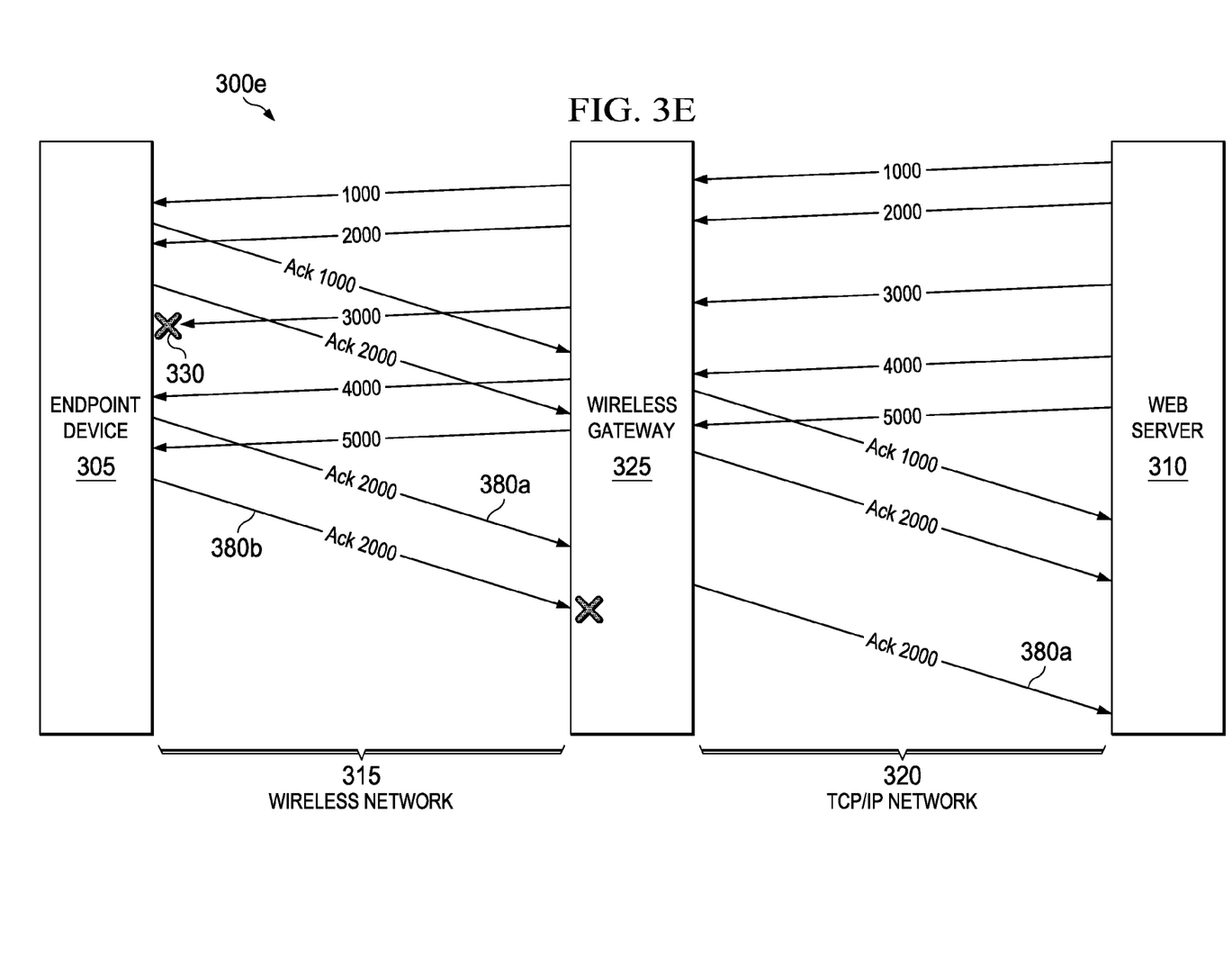

Upon filtering a duplicate ACK and causing a replacement packet to be forwarded to the client device 305, gateway 325 can continue to monitor communication between the client device 305 and the web server 310 and gather data for use in confirming that the gateway acted correctly in blocking one or more duplicate ACKs to the web server. Turning to FIG. 3D, in some instances, upon identifying additional duplicate ACKs 370a-b or other error messages originating from the monitored client in a communication session with a particular server, gateway 325 may determine that it is appropriate to allow the error messages (e.g., 370a-b) to proceed on to the server 310, whereas the gateway elected to filter earlier messages (e.g., 335 in FIGS. 3B-3C) earlier in the communication session. In short, as gateway collects more information for a particular data flow, particular base station, client, or RAN, including information from monitored TCP messages, the gateway can change, correct, or otherwise its response to subsequent data flows, including its response to (and predictions regarding the causes of) particular TCP error messages, such subsequent duplicate ACKs.

Further, in some instances, and according to some example rules, policies, and thresholds values, a gateway can begin filtering TCP error messages, including duplicate ACKs, after first allowing some error messages to be passed to a web server 310. For instance, in the example of FIG. 3E, gateway 325 can apply a filtering rule that is triggered when multiples of the same duplicate ACK message are forwarded from the same client 305 (e.g., indicating that wireless loss is more likely than not responsible for the loss of the packet 3000). Indeed, in some implementations of TCP, a web server may permit a particular number of duplicate ACKs in a communication with a particular client before triggering a reduction in the client's congestion window. Gateway 325 can leverage this grace period by selectively filtering duplicate ACKs once multiples of the same duplicate are received. Accordingly, in some implementations, such as the example of FIG. 3E, first duplicate ACKs (e.g., 380a) may be allowed to be forwarded to the server 310 while subsequent duplicate ACKs (e.g., 380b) are filtered. In other instances, gateway 325 can temporarily cache or buffer received TCP error messages, such as duplicate ACKs, to permit the gateway 325 to gather more information and determine whether the TCP error message should be forwarded on to the server 310 or filtered at the gateway 325. Returning to the example of FIG. 3E, gateway 325, rather than forwarding a first received copy of a particular duplicate ACK 380a, gateway 325 can buffer the first copy 380a while waiting to see if multiples (e.g., 380b) of the duplicate ACK are also received, in excess of a particular threshold, or otherwise triggering filtering (or forwarding) of the duplicate ACK in accordance with a pre-established rule or condition.

Figure 4:
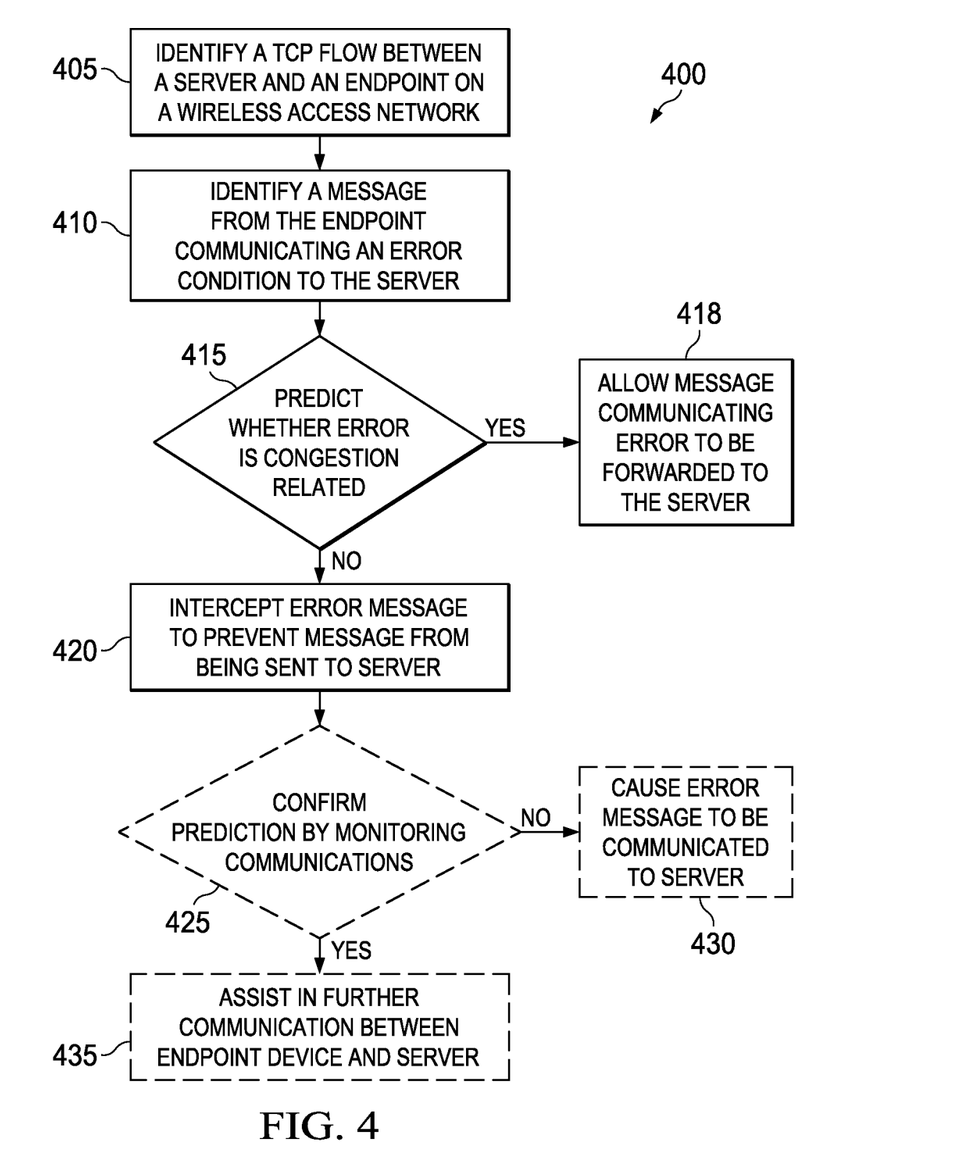
FIG. 4 is a simplified flowchart of an example technique for managing error messages within a wireless communications environment in accordance with at least some embodiments.

Turning to FIG. 4, a simplified flowchart 400 is shown of an example technique for managing TCP errors in a wireless access network. A data flow can be identified 405 between a server and an endpoint device, including a series of packets communicated from the server to the endpoint device at least partially over a network employing TCP, the endpoint accessing a core network over a wireless access network. A message can be identified 410 from the endpoint device communicating an error condition to the server, for instance, in accordance with TCP. The message can include a TCP duplicate ACK message in some instances. Such error messages can be monitored to predict 415 whether particular error messages reflect a congestion condition within the wireless access network, or some other non-congestion-related error condition. For instance, an error message, such as a TCP duplicate ACK, can be generated due to packet loss resulting from lossy conditions in the wireless network rather than congestion. If it is predicted that the error is likely based on a congestion condition within the wireless access network, the message can be allowed 418 to be communicated to the server. However, if it is predicted that the error conveyed in the message is a byproduct of a non-congestion-related condition within the wireless access network, the error message can be intercepted 420 and filtered so that the error condition is not communicated to the server.

Communication can proceed between the endpoint device and server, as well as analysis, for instance, by a network gateway performing one or more steps of the techniques of flowchart 400. The prediction of the source of the error message can be attempted to be confirmed 425. If it is determined, after further analysis, receipt of additional data (e.g., further error messages), etc. that the original prediction was likely incorrect and that the error messages relating to the flow are actually likely congestion-related, error messages can be allowed to be communicated to the server. In certain instances, error messages initially withheld from the server (e.g., at 420) can themselves be forwarded to the server. However, if the original determination that the error condition is not congestion-related is confirmed 425, communication between the endpoint and server can be further facilitated or assisted (i.e., at 435).

In addition to managing TCP error messaging from endpoint devices within a wireless access network, gateway systems and devices can additionally, in some implementations, also use information collected and obtained through monitoring of TCP error messaging to perform additional tasks and services to improve the functionality of the wireless access network. Using such data, a gateway system or device, or other similar components, can quantitatively characterize conditions on a radio channel on a longer time-scale, and without having to add a new feedback control protocol between the base-station and gateway. Further, in some instances, such as in a typical cellular deployment, a gateway can serve hundreds of base-stations at any time, and exchange packets with each one, for instance, through a tunneling protocol, such as GTP for 3GPP and GRE for NWG/WiMAX. Since data traffic can be aggregated at the gateway, the incident TCP error messages, such as duplicate ACKs, can be monitored by way of deep packet inspection (or "DPI"). Depending on the remote IP address and tunnel endpoint identifier, TCP duplicate ACKs from a particular base-station or RAN can be pinpointed and counted. Statistics can then be aggregated at the level of flows, sessions, and base-stations (or groups of base-stations). The ability to monitor congestion at the base-station- or other sub-network-level can allow appropriate quality of service (QoS) policies to be deployed at the gateway. The gateway can then adapt the offered data traffic load to each base-station, subnetwork, etc. according to an anticipated congestion level. To this end, spectrum usage can be improved within the radio channel. Moreover, by defining suitable thresholds for TCP error messages, such as duplicate ACKs arrival rates, the gateway can send SNMP traps whenever these thresholds are violated to gather additional information about events responsible for the errors. Such information can also be used in an analysis of the access network and be useful for network management and diagnostics. For instance, information derived from TCP monitoring has applications in network management and diagnostics, as well as for inter-cell interference coordination (ICIC). Additionally, dynamic QoS provisioning can be deployed, in certain implementations, based on different congestion levels.

In one particular illustrative example, for a single TCP connection, three duplicate ACKs may cause a sender server to cut the corresponding congestion window. While this may not necessarily constitute congestion on a per TCP flow level, the aggregate of duplicate ACKs across all TCP connections through a single base-station (or group of base stations) can provide an indication that this base-station is unable to service the offered TCP load. By monitoring TCP duplicate ACKs, operators can be provided with data used in flagging certain base-stations that may have significantly higher number of duplicate ACKs (missing segments or losses) than others. The number of missing segments can correlate to the base station service rate capability. Traffic shaping can then be invoked at the gateway to regulate the offered TCP load at the gateway based on the capabilities, vulnerabilities, and/or tendencies of individual base stations served by the base station.

Figure 5:
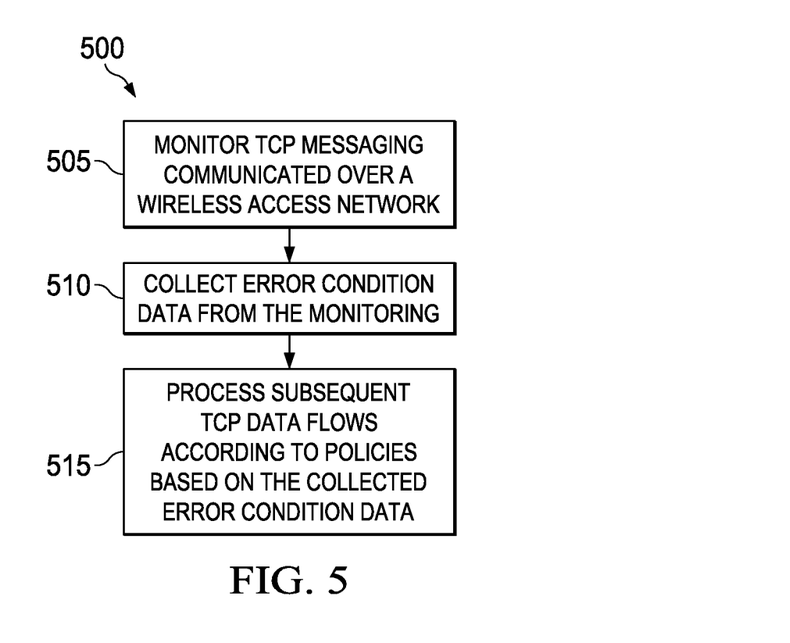
FIG. 5 is a simplified flowchart of an example technique for monitoring error messages within a wireless communications environment in accordance with at least some embodiments.

Turning to FIG. 5, a simplified flowchart 500 is shown of an example technique for using TCP error data collected during monitoring of TCP traffic. TCP messaging can be monitored 505, for instance using a gateway of a wireless access network, at least some of the TCP messaging conveying error conditions within a wireless access network. Error condition data can be collected 510 from the monitoring. Error condition data can include identification of network components, logical divisions, client devices, and other identifiers. At least one subsequent TCP data flow conveyed over the wireless access network can be processed 515 in accordance with one or more policies based at least in part on collected error condition data, including error condition data aggregated over certain periods of time, or over multiple base-stations, subnetworks, client endpoint devices, and other logical network element groupings.

Note that certain example implementations and functions outlined herein may be implemented by logic encoded in one or more tangible machine-readable media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element (e.g., such as included in gateway 205 or in connection with TCP manager 210) can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor (e.g., such as included in gateway 205 or in connection with TCP manager 210) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

In one example implementation, networking devices such as those shown or described in connection in any one of the above figures, may include software in order to achieve any of the functions outlined herein. Such networking devices can include memory elements for storing information to be used in achieving the functions and activities discussed herein. Additionally, such networking devices can further include a processor that can execute software or an algorithm to perform the operations and features disclosed herein. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein (e.g., database, data structure, data record, tables, trees, cache, etc.) should be construed as being encompassed within the broad term "memory," "memory device," or "memory element." Similarly, any of the potential processing elements, modules, and machines described herein should be construed as being encompassed within the broad term "processor," "processing device," or "computing device." Each of the computing devices and network elements can also include suitable interfaces for receiving, transmitting, and/or otherwise communicating data or information in a network environment.

Note that with the example provided above, as well as numerous other examples provided herein, interaction may be described in terms of two, three, or four network elements, devices, or components. However, this has been done for purposes of illustration and example only. In certain cases, it may be easier to describe one or more of the functionalities of a given set of flows by only referencing a limited number of network elements. It should be appreciated that the described services and systems (e.g., 100) (and corresponding teachings) can be readily scalable and can accommodate a large number of components, as well as far more complicated/sophisticated arrangements and configurations. Accordingly, the examples provided should not limit the scope or inhibit the broad teachings of the above systems and services as potentially applied to a myriad of other architectures.

It is also important to note that the steps in the preceding flow diagrams illustrate only some of the possible signaling scenarios and patterns that may be executed by, or within, a communication system. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by a communication system (e.g., 100) in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain endpoint components and certain protocols (e.g., TCP, IP, 3GPP, etc.), system 100 may be applicable to other protocols and arrangements. Moreover, the present disclosure is equally applicable to various technologies as these have only been offered for purposes of discussion. Along similar lines, communication systems implementing some or all of the above-disclosed features can be extended to any wireless access network implementation.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking, cloud, and parallel processing may be advantageous.

What is claimed is:

1. A method comprising:
identifying a flow of packets sent from a server device over a TCP network via a gateway device to at least one endpoint device, the endpoint device accessing the TCP network via the gateway device over a wireless access network, such that the endpoint device communicates with the server device via the gateway device;
caching a series of the packets to facilitate sending a copy of at least one of the series of packets to the endpoint device;
identifying a message to be sent from the endpoint device to the server device via the gateway device, wherein the message communicates an error condition relating to at least one packet in the flow;
predicting that the error condition is based, at least in part, on a non-congestion-related condition within the wireless access network;
filtering the message to exclude communication of the error condition to the server device based on the prediction that the error condition is based, at least in part, on the non-congestion-related condition within the wireless access network; and
when the error condition identifies a loss of at least one packet in the flow of packets, identifying a particular lost packet from the message, retrieving a copy of the particular lost packet from the caching, and sending the co of the s articular lost packet to the endpoint device.

2. A method comprising:
identifying a flow of packets sent from a server device over a TCP network via a gateway device to at least one endpoint device, the endpoint device accessing the TCP network via the gateway device over a wireless access network, such that the endpoint device communicates with the server device via the gateway device;
identifying a message from the endpoint device to the server device via the gateway device communicating an error condition relating to at least one packet in the flow;
predicting that the error condition is based, at least in part, on a non-congestion-related condition within the wireless access network; and
filtering the message to exclude communication of the error condition to the server device based on the prediction that the error condition is based, at least in part, on the non-congestion-related condition within the wireless access network; and
when the error condition identifies a loss of at least one packet in the flow of packets, identifying a particular lost packet from the message, requesting a copy of the particular lost packet from the server device, and forwarding the copy of the particular lost packet to the endpoint device.

3. The method of claim 2, further comprising when the error condition is predicted to be based, at least in part, on lossy conditions within the wireless access network, allowing the error condition to be forwarded to the server device.

4. The method of claim 1, further comprising when the error condition is predicted to be based, at least in part, on lossy conditions within the wireless access network, allowing the error condition to be forwarded to the server device.

5. The method of claim 1, further comprising:
attempting to remedy the error condition; and
monitoring communication between the endpoint device and the server device following attempting to remedy the error condition.

6. The method of claim 5, further comprising revising the prediction, based on the monitoring, to predict that the error condition is based on a congestion-related condition.

7. The method of claim 1, further comprising identifying a particular portion of the wireless access network corresponding to the error condition.

8. The method of claim 7, wherein a particular base station within the wireless access network is identified corresponding to the error condition.

9. The method of claim 1, further comprising collecting error data from the message for use in statistical analysis of the wireless access network.

10. The method of claim 9, wherein the statistical analysis is based on a plurality of TCP messages, each message in the plurality of TCP messages communicating a respective error condition within the wireless access network.

11. The method of claim 9, further comprising:
using results of the statistical analysis to generate a policy for the wireless access network; and
routing subsequent data flows within the wireless access network according to the generated policy.

12. The method of claim 1, wherein predicting that the error condition is based, at least in part, on a non-congestion-related condition within the wireless access network includes identifying at least two TCP duplicate ACK messages for a particular lost packet in the flow sent from the endpoint device.

13. A non-transitory media encoded with logic that includes code for execution and when executed by a processor is operable to perform operations comprising:
identifying a flow of packets sent from a server device over a TCP network via a gateway device to at least one endpoint device, the endpoint device accessing the TCP network via the gateway device over a wireless access network, such that the endpoint device communicates with the server device via the gateway device;
caching a series of the packets to facilitate sending a copy of at least one of the series of packets to the endpoint device;
identifying a message to be sent from the endpoint device to the server device via the gateway device, wherein the message communicates an error condition relating to at least one packet in the flow;
predicting that the error condition is based, at least in part, on a non-congestion-related condition within the wireless access network;
filtering the message to exclude communication of the error condition to the server device based on the prediction that the error condition is based, at least in part, on the non-congestion-related condition within the wireless access network; and
when the error condition identifies a loss of at least one packet in the flow of packets, identifying a particular lost packet from the message, retrieving a copy of the particular lost packet from the caching, and sending the copy of the particular lost packet to the endpoint device.

14. A system comprising:
at least one processor device;
at least one memory element; and a TCP message manager configured, when executed by the at least one processor device, to:

identify a flow of packets sent from a server device over a TCP network via a gateway device to at least one endpoint device, the endpoint device accessing the TCP network via the gateway device over a wireless access network, such that the endpoint device communicates with the server device via the gateway device;

cache a series of the packets to facilitate sending a copy of at least one of the series of packets to the endpoint device;

identify a message to be sent from the endpoint device to the server device via the gateway device, wherein the message communicates an error condition relating to at least one packet in the flow;

predict that the error condition is based, at least in part, on a non-congestion-related condition within the wireless access network;

filter the message to exclude communication of the error condition to the server device based on the prediction that the error condition is based, at least in part, on the non-congestion-related condition within the wireless access network; and when the error condition identifies a loss of at least one packet in the flow of packets, identify a particular lost packet from the message, retrieve a copy of the particular lost packet from the cache, and send the copy of the particular lost packet to the endpoint device.

15. The system of claim 14, wherein the gateway device includes the TCP message manager.

16. The system of claim 14, further comprising a TCP messaging analysis engine, configured when executed by the at least one processor device to:

identify a plurality of TCP messages sent from devices over the wireless access network;

determine characteristics of the wireless access network based on the plurality of TCP messages; and define at least one policy based on the determined characteristics, wherein subsequent data flows are routed within the wireless access network according to the at least one policy.

17. A non-transitory media encoded with logic that includes code for execution and when executed by a processor is operable to perform operations comprising:

identifying a flow of packets sent from a server device over a TCP network via a gateway device to at least one endpoint device, the endpoint device accessing the TCP network via the gateway device over a wireless access network, such that the endpoint device communicates with the server device via the gateway device;

identifying a message from the endpoint device to the server device via the gateway device communicating an error condition relating to at least one packet in the flow;

predicting that the error condition is based, at least in part, on a non-congestion-related condition within the wireless access network;

filtering the message to exclude communication of the error condition to the server device based on the prediction that the error condition is based, at least in part, on the non-congestion-related condition within the wireless access network; and when the error condition identifies a loss of at least one packet in the flow of packets, identifying a particular lost packet from the message, requesting a copy of the particular lost packet from the server device, and forwarding the copy of the particular lost packet to the endpoint device.

18. A system comprising:

at least one processor device;

at least one memory element; and a TCP message manager configured, when executed by the at least one processor device, to:

identify a flow of packets sent from a server device over a TCP network via a gateway device to at least one endpoint device, the endpoint device accessing the TCP network via the gateway device over a wireless access network, such that the endpoint device communicates with the server device via the gateway device;

identify a message from the endpoint device to the server device via the gateway device communicating an error condition relating to at least one packet in the flow;

predict that the error condition is based, at least in part, on a non-congestion-related condition within the wireless access network;

filter the message to exclude communication of the error condition to the server device based on the prediction that the error condition is based, at least in part, on the non-congestion-related condition within the wireless access network; and when the error condition identifies a loss of at least one packet in the flow of packets, identifying a particular lost packet from the message, requesting a copy of the particular lost packet from the server device, and forwarding a copy of the particular lost packet to the endpoint device.

* * * * *